(12) United States Patent
Stamp et al.

(10) Patent No.: US 12,662,122 B2
(45) Date of Patent: Jun. 23, 2026

(54) FOLLOWING DISTANCE BASED ON HISTORIC BRAKE EVENTS

(71) Applicant: Scania CV AB, Södertälje (SE)

(72) Inventors: Alexander Stamp, Huddinge (SE); Mikael Alenius, Segeltorp (SE)

(73) Assignee: Scania CV AB, Södertälje (SE)

( * ) Notice: Subject to any disclaimer, the term of this patent is extended or adjusted under 35 U.S.C. 154(b) by 2 days.

(21) Appl. No.: 18/666,975

(22) Filed: May 17, 2024

(65) Prior Publication Data

US 2024/0391460 A1 Nov. 28, 2024

(30) Foreign Application Priority Data

May 26, 2023 (SE) ..................................... 2350643-9

(51) Int. Cl.
*B60W 30/16* (2020.01)
*B60W 50/00* (2006.01)

(52) U.S. Cl.
CPC ........ *B60W 30/16* (2013.01); *B60W 50/0097* (2013.01); *B60W 2754/30* (2020.02)

(58) Field of Classification Search
CPC ............. B60W 30/16; B60W 50/0097; B60W 2754/30; B60W 2552/40; B60W 2554/801; B60W 2554/802; B60W 2554/804; B60W 10/04; B60W 30/18; B60W 30/18109;

(Continued)

(56) References Cited

U.S. PATENT DOCUMENTS 9,183,745 B2 * 11/2015 Huber .................... B60W 30/16
9,187,093 B1 * 11/2015 Sujan .................... B60W 30/14
(Continued)

FOREIGN PATENT DOCUMENTS

CN 114329306 A 4/2022
CN 115547047 A 12/2022
(Continued)

OTHER PUBLICATIONS

EP-1504948-B1 translation (Year: 2008).*
(Continued)

*Primary Examiner* — Kyle T Johnson
(74) *Attorney, Agent, or Firm* — Moore & Van Allen PLLC; W. Kevin Ransom

(57) ABSTRACT
The present disclosure relates to determining a following distance, between a vehicle and a vehicle travelling ahead. According to a first aspect, the disclosure relates to a method that comprises obtaining an amount of energy required to propel the vehicle along the upcoming road as a function of following distance to the vehicle travelling ahead and predicting, based on brake actuation performed by the vehicle during a previous time period, one or more driving disadvantages that will be caused by braking along an upcoming road as a function of the following distance. The method further comprises determining the following distance, based on the obtained amount and on the predicted driving disadvantages caused by braking along the upcoming road. The disclosure also relates to a corresponding control arrangement and computer program, and to a vehicle comprising the control arrangement.

15 Claims, 2 Drawing Sheets

(58) Field of Classification Search

CPC ..... B60W 2710/0666; B60W 2720/10; B60W 2720/103

See application file for complete search history.

(56) References Cited

U.S. PATENT DOCUMENTS

| | | | | |
|---|---|---|---|---|
| 2003/0158648 | A1* | 8/2003 | Kubota | B60K 31/0008 |
| | | | | 123/352 |
| 2010/0049400 | A1* | 2/2010 | Duraiswamy | B60W 30/143 |
| | | | | 701/123 |
| 2018/0105186 | A1* | 4/2018 | Motomura | G06V 20/597 |
| 2018/0141557 | A1* | 5/2018 | Nefcy | B60K 6/48 |
| 2019/0367032 | A1* | 12/2019 | Ito | B60W 50/00 |
| 2019/0378040 | A1* | 12/2019 | Ali | B60W 30/18145 |
| 2020/0017107 | A1* | 1/2020 | Takahashi | B60W 30/143 |
| 2020/0216069 | A1* | 7/2020 | Elflein | B60W 50/0097 |
| 2020/0398837 | A1* | 12/2020 | Kumara | B60W 30/16 |
| 2022/0219691 | A1* | 7/2022 | Maleki | G06F 11/0754 |
| 2023/0303052 | A1* | 9/2023 | Gesang | B60W 20/15 |
| 2024/0190432 | A1* | 6/2024 | Alenius | B60W 30/182 |
| 2024/0375653 | A1* | 11/2024 | Selling | B60W 30/16 |
| 2024/0391460 | A1* | 11/2024 | Stamp | B60W 30/16 |
| 2025/0171026 | A1* | 5/2025 | Quibriac | B60W 60/001 |

FOREIGN PATENT DOCUMENTS

| | | | | | |
|---|---|---|---|---|---|
| CN | 119408537 | A | * | 2/2025 | B60W 50/0098 |
| DE | 102016006523 | A1 | * | 12/2016 | G08G 1/096725 |
| DE | 102022103430 | A1 | * | 9/2022 | B60W 30/143 |
| EP | 1504948 | B1 | * | 1/2008 | B60K 31/185 |
| EP | 1890903 | B1 | * | 11/2011 | B60W 30/16 |
| EP | 3081447 | A1 | | 10/2016 | |
| EP | 3317693 | B1 | * | 8/2021 | G01S 13/58 |
| SE | 541221 | C2 | | 5/2019 | |
| WO | 2022012217 | A1 | | 1/2022 | |
| WO | 2022130019 | A1 | | 6/2022 | |

OTHER PUBLICATIONS

EP-1890903-B1 translation (Year: 2014).*

CN-119408537-A translation (Year: 2025).*

EP-3317693-B1 translation (Year: 2021).*

DE-102022103430-A1 translation (Year: 2022).*

DE-102016006523-A1 translation (Year: 2016).*

Development of braking system for platooning driving (Year: 2011).*

Scania CV AB, Swedish Patent Application No. 2350643-9, Office Action, Jan. 5, 2024.

Zhou, H., et al., "Congestion-mitigating MPC design for adaptive cruise control based on Newell's car following model: History outperforms prediction", Transportation Research Part C, 2022, vol. 142.

Zhang, Y., et al., "A data-driven behavior generation algorithm in car-following scenarios", chapter in Dynamics of Vehicles on Roads and Tracks vol. 1, 1st Edition, 2017.

Fan, P., et al., "Car-Following Modeling Incorporating Driving Memory Based on Autoencoder and Long Short-Term Memory Neural Networks", Sustainability, 2019, vol. 11, 6755.

* cited by examiner

S1
Obtain energy required to propel the vehicle along an upcoming road as a function of distance to the vehicle travelling ahead S2
Predict, based on braking applied by the vehicle during a previous time period, one or more driving disadvantages that will be caused by frictional braking along an upcoming road as a function of the distance S3
Determine the distance, based on the predicted driving disadvantages and on the obtained amount of energy required to propel the vehicle along the upcoming road S4
Control the vehicle to maintain the determined following distance.

S5
Adjust the previous time period, upon detecting a change in speed limit of the road the vehicle is driving.

FIG. 3

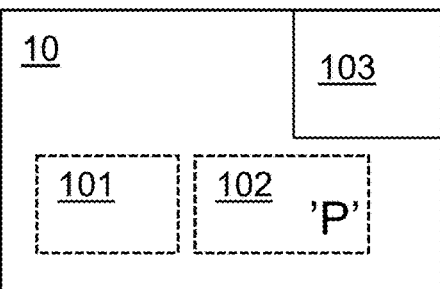

FIG. 4

FOLLOWING DISTANCE BASED ON HISTORIC BRAKE EVENTS

CROSS-REFERENCE TO RELATED APPLICATIONS

This application claims priority to Swedish Patent Application No. 2350643-9 filed May 26, 2023, of the same title; the contents of which are hereby incorporated by reference.

TECHNICAL FIELD

The present disclosure relates to a method for controlling operation of a vehicle. In particular the disclosure relates to determining a following distance, between a vehicle and a vehicle travelling ahead. The disclosure also relates to a corresponding control arrangement and computer program, and to a vehicle comprising the control arrangement.

BACKGROUND

Adaptive Cruise Control, ACC, systems use on-board vehicle sensors to detect the distance between the host vehicle and a vehicle travelling ahead of the host, and the relative speed difference between the vehicles. The ACC automatically adjusts the speed of the host vehicle to keep it at a pre-set distance or time gap behind the vehicle travelling ahead. More specifically, the adaptive cruise control system generates automatic interventions in the powertrain and/or braking systems of the host vehicle to slow the vehicle as necessary to maintain a target following distance. The target following distance is normally based on the pre-set following distance or time gap but may also be influenced by other factors such as power efficiency, road conditions and safety requirements. However, setting a target following distance that balances between energy consumption (which is decreased at close following distances between e.g. trucks) and driving disadvantages associated with travelling too close has turned out to be challenging. Hence, there is a need for improved methods to determine a target following distance.

SUMMARY

It is an objective of the present disclosure to provide methods for determining a following distance that balances energy consumption and driving disadvantages associated with travelling too close. In particular it is an objective to provide methods for determining a following distance that minimizes energy losses caused by close following distances, due to more braking. It is also an objective to provide a method to determine a target following distance that does not rely on the vehicle being on-line. These objectives and others are at least partly achieved by the method, control arrangement, and vehicle according to the independent claims, and by the embodiments according to the dependent claims.

According to a first aspect, the disclosure relates to a method for determining a following distance, between a vehicle and a vehicle travelling ahead, The method comprises obtaining an amount of energy required to propel the vehicle along the upcoming road as a function of following distance to the vehicle travelling ahead and predicting, based on brake actuation performed by the vehicle during a previous time period, one or more driving disadvantages that will be caused by braking along an upcoming road as a function of the following distance. The method further comprises determining the following distance, based on the obtained amount and on the predicted driving disadvantages caused by braking along the upcoming road. By determining the following distance based on information about historical braking applied by the vehicle, a balanced following distance may be determined. More specifically, energy consumption benefits associated with driving close can be weighed against corresponding disadvantages derived from historical data. As historical data is readily available in the vehicle, I method does neither rely on additional sensor data nor on communication with other vehicles or road objects. Hence, the method does not require any particular hardware and can be performed also when the vehicle is off-line, i.e. not connected to other vehicles or road objects via the internet or similar. Hence, it may be used as a fall back to other solutions.

In some embodiments, the predicting is based on a metric indicative of brake actuation comprising highest braking force applied by the vehicle during the previous time period. Hence, the following distance can be adjusted to consider severe brake events in the past, as such events may cause severe disadvantages.

In some embodiments, the predicting is based on a metric indicative of brake actuation comprising an upper quartile of braking force applied by the vehicle during the previous time period. Hence, the following distance can be adjusted to consider history of relatively high braking (i.e., the upper 25%). By using the upper quartile as a basis all it can be assured that all major braking is considered and not only the most severe brake events. This may be beneficial as it is not only the most severe braking that causes disadvantages.

In some embodiments, the predicting is based on a metric indicative of brake actuation comprising median or average braking force applied by the vehicle during the previous time period. By using an average or median, a relatively credible prediction of future brake actuation can be made, which is not affected too much by extreme events.

In some embodiments, the predicting is based on a count of brake events and/or timing of brake events performed during the previous time period. Hence, when and how often brake events have occurred in the past may also be considered when determining the following distance. Thereby, the prediction may be further improved.

In some embodiments, a duration of the previous time period is at least 5 minutes, or at least 10 minutes. Thus, various durations may be applied depending on the situation. A time period of 5 or 10 minutes typically provides a reasonable measure about current driving conditions, such as traffic.

In some embodiments, driving disadvantages includes one or more of energy loss, efficiency losses (for example in engine or gear box), driver or passenger discomfort and safety risks. Thus, the proposed technique may be used to mitigate various disadvantages associated with braking.

In some embodiments, the determining is performed in consideration of a sum of energy required to propel the vehicle in the upcoming road and a predicted energy loss caused by braking. By balancing energy consumption and braking losses energy consumption may be optimized.

In some embodiments, the length of the previous time period is based on a speed limit of the road the vehicle is travelling on. Hence, the historic period considered may be adapted depending on the type of road, which typically corresponds to speed limitation. Thereby, a suitable following distance may be calculated for each type of road.

In some embodiments, the method comprises adjusting the previous time period based on the new speed limit, upon detecting a change in speed limit of the road the vehicle is driving. Hence, when entering a new type of road, data from the old road is typically not relevant and is therefore thrown away.

In some embodiments, the obtaining is based on measurements and/or on predetermined criteria. Hence, the energy consumption may be determined in different ways.

In some embodiments, the obtaining is based on one or more of the following: vehicle speed, type of vehicle travelling ahead, inclination of road and friction. Hence, any factor that affect energy consumption may be considered when analyzing how drag is affected by the following distance.

In some embodiments, the following distance is further based on one or more of: a reference following distance input by a user, road inclination, road friction, driver and passenger comfort and safety limits. Hence, when determining the following distance based on braking history other relevant parameters may be considered as well.

According to a second aspect, the disclosure relates to a computer program comprising instructions which, when the computer program is executed by a computer, cause the computer to carry out the method according to the first aspect. According to a third aspect, the disclosure relates to a computer-readable medium comprising instructions which, when executed by a computer, cause the computer to carry out the method according to the first aspect.

According to a fourth aspect, the disclosure relates to a control arrangement configured to perform the method according to the first aspect.

According to a fifth aspect, the disclosure relates to a vehicle comprising the system according to the fourth aspect.

Corresponding effects as for the first aspect can be achieved by the second to fifth aspects.

BRIEF DESCRIPTION OF THE DRAWINGS

The embodiments disclosed herein are illustrated by way of example, and by not by way of limitation, in the figures of the accompanying drawings. Like reference numerals refer to corresponding parts throughout the drawings, in which:

FIG. 3 is a flow chart of an example method according to the first aspect.

FIG. 4 illustrates a control arrangement configured to perform the proposed method.

DETAILED DESCRIPTION

Figure 1:
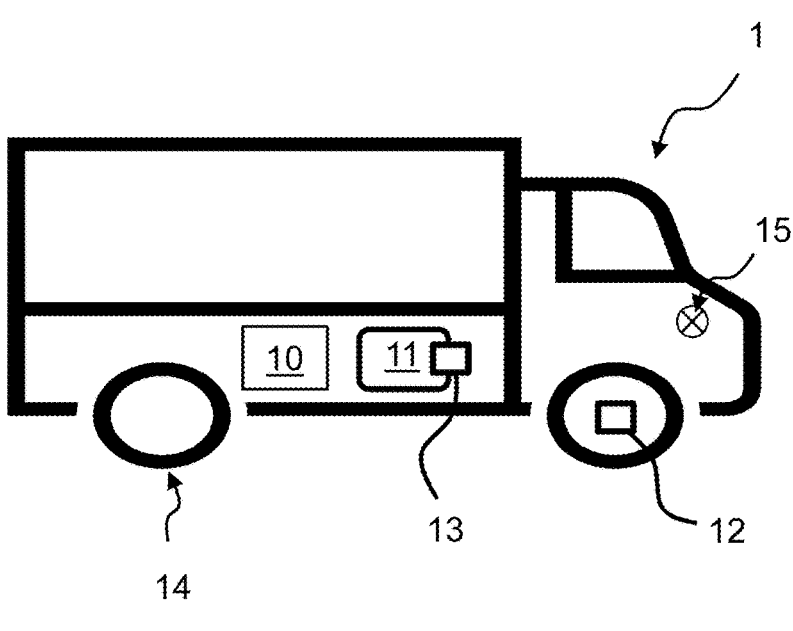
FIG. 1 illustrates a vehicle where the proposed technique may be implemented.

An Adaptive Cruise Control, ACC, system uses radar, lidar or other sensors to detect the distance between the vehicle and other vehicles on the road. If the ACC determines that the vehicle is getting too close to the vehicle travelling ahead, it can actuate the brakes to slow the vehicle down and maintain a safe distance.

When an ACC is activated a user (often the driver) enters a desired following distance. The desired following distance may be defined in meters (e.g. 10 meters) or in time (e.g. 3 seconds). The ACC then configures a target following distance, which is a distance between the vehicle 1 and a vehicle travelling ahead 2 (herein also simply called the followed vehicle 2) that the ACC tries to maintain. The ACC will of course consider the desired following distance when setting the target following distance, but in some situations, there may be a deviation between the desired following distance and the target following distance due to safety or energy consumption reasons.

The ACC is configured to control the vehicle to keep the target following distance as well as possible. When an ACC brakes the vehicle to maintain the target following distance the secondary brakes are typically used as much as possible. However, if the vehicle comes too close to the followed vehicle 2 the primary brakes are also actuated.

To travel close to the vehicle travelling ahead is often associated with energy savings due to reduced drag. Drag refers to the aerodynamic resistance that a vehicle encounters as it moves through the air. More specifically, when a vehicle is in motion, the air exerts pressure on its front surface, resulting in a force pushing against the forward motion of the vehicle. The magnitude of the drag force depends on several factors, including vehicle dynamics, speed, and the properties of the air, such as density and viscosity.

However, driving too close to the vehicle travelling ahead may also be disadvantageous, as a decreased following distance will often lead to more brake actuation. In particular, the risk that primary brakes, that are commonly frictional brakes, will be activated due to severe braking is increased. There may also be other disadvantages associated with an increased amount of braking, such as losses due to efficiency of regeneration and powertrain losses as heat may be generated in for example electric machine/battery and rear axle/gearbox. Another disadvantage may be driver or passenger discomfort, which may result in the driver shutting of the ACC.

The proposed technique is based on the idea of considering historical brake actuation stored in the vehicle as a basis when determining the target following distance. In other words, it is herein proposed that brake actuation performed during a preceding time interval is used to predict future brake actuation. An optimized target following distance may then be determined by weighing predicted disadvantages caused by driving close to corresponding energy savings associated with reduced drag.

FIG. 1 illustrates a vehicle 1 where the proposed technique may be implemented. The vehicle 1 may comprise a means for transportation in broad sense and is for example a bus, a truck, or other similar manned or unmanned vehicle. The illustrated vehicle 1, here a truck, comprises a propulsion arrangement 11, primary brakes 12, secondary brakes 13, tires 14, sensors 15 and a control arrangement 10 that for example implements ACC. The propulsion arrangement 11 comprises an engine and a drive train that transfers the motion to the wheels of the vehicle 1. The engine may include one or more of a combustion engine and an electrical engine. The primary brakes 12 are typically disc brakes or drum brakes, while the secondary brakes 13 comprises auxiliary brakes such as engine brakes or a retarder. In an electrical or hybrid vehicle the secondary brakes 13 may also or alternatively include regenerative brakes that recover braking energy and converts it into electricity.

The vehicle 1 also comprises sensors 15 used to monitor different functions and states of the vehicle 1, to provide information to the driver or to different systems of the vehicle 1. The sensors 15 may include one or more of: speed sensors, temperature sensors, position sensors, motion sensors, gyros, power sensors pressure sensors, humidity sensors etc. Each sensor 15 converts sensed events or changes of a property into a signal or data that is sent to, or collected by, the control arrangement 10. Such signals or data are, for example, sent over a CAN (Controller Area Network), or similar, of vehicle 1. The plurality of sensors 15 comprises vehicle sensors (such as LIDAR, RADAR and image sensors) for monitoring the surroundings of the vehicle 1. The output from the vehicle sensors 15 may provide input to the ACC or to an autonomous control system of the control arrangement 10, for use in autonomous driving.

Figure 2:
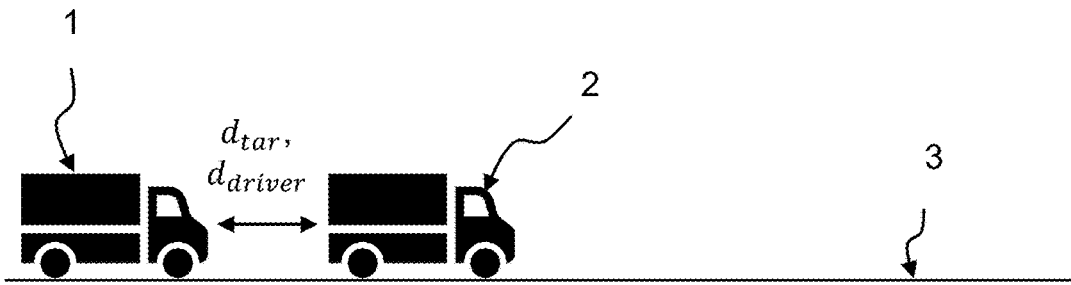
FIG. 2 illustrates different following distance between a vehicle and a vehicle travelling ahead.
Figure 2:
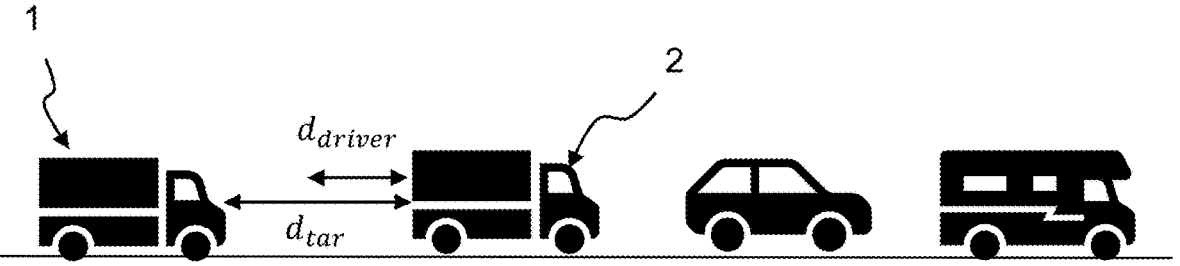

FIG. 2 illustrates different following distance between a vehicle and a vehicle travelling ahead in accordance with the proposed technique. More specifically, the following distance $d_{tar}$ in-between the vehicles that the vehicle 1 tries to maintain depends on historic brake actuation. In the upper image, the historic brake actuation is low, as there is little traffic. In a typical scenario there are few vehicles in the vicinity, or vehicles in front are driving smoothly at the same speed as the vehicle 1. Hence, the following distance $d_{tar}$ can e.g. be set to the configured following distance $d_{driver}$ set by the driver (if present) or to a predefined minimum (or default) following distance, which is for example based on safety requirements. This means that the drag can be reduced.

However, in the lower image there are many vehicles 1, 2 on the road. It may also be that other vehicles are entering the road, which causes braking of the vehicle 1 or of vehicles in front. Hence, historic brake actuation is high. Hence, the benefit of reduced drag is expected to be lower than the disadvantages associated with frequent braking. This means that the following distance $d_{tar}$ will be set to be longer than in the previous case, e.g. it is set to be longer than the configured following distance $d_{driver}$ set by the driver. Thereby, too much braking and associated disadvantages can be avoided.

FIG. 3 illustrates the proposed method for determining a target following distance (herein called simply following distance), between a vehicle 1 and a vehicle travelling ahead 2.

The method is for use in a control arrangement, such as the control arrangement 10 of the vehicle 1 (FIG. 1). The method is typically performed during normal operation of the vehicle 1 (FIG. 1), such as when an ACC is activated to control speed of the vehicle 1. Alternatively, the method may be performed to control operation of an autonomous vehicle. The method may be performed continually, in an ongoing manner during driving. In other words, the method steps S1-S5 may be repeated as often as feasible or required.

The method may be implemented as computer program comprising instructions which, when the program is executed by a computer (e.g., a processor in the control arrangement 10 (FIG. 4)), cause the computer to carry out the methods. According to some embodiments the computer program is stored in a computer-readable medium (e.g., a memory or a compact disc) that comprises instructions which, when executed by a computer, cause the computer to carry out the method.

As explained above, typically the power consumption of the vehicle depend on how close to a preceding vehicle the vehicle 1 drives. Power consumption typically depends on a variety of parameters, such as speed, load and driving conditions. What is relevant in this context is how energy consumption (e.g. fuel or electricity) depend on the following distance. In other words, the method comprises obtaining S1 an amount of energy required to propel the vehicle 1 along the upcoming road 3 as a function of following distance $d_{tar}$ to the vehicle travelling ahead 2. The purpose is basically to investigate how drag is affected by the following distance under current driving conditions and how much energy can be saved by driving close. In other words, the obtaining S1 corresponds to determining how energy consumption of the vehicle 1 varies with the following distance. In must be anticipated that the amount of energy saved by driving close depend on current operating conditions.

There are various ways to estimate the energy consumption. Typically, the amount may be obtained based on a predefined model or similar, that takes relevant parameters, such as sensor readings, into account. For example, the power consumption is based on a model that takes at least speed and load as input. In other words, in some embodiments, the obtaining S1 is based on predetermined criteria, such as a power consumption model. In some embodiments, the obtaining S1 is also based on one or more of the following: type of vehicle travelling ahead, inclination of road and friction, as these parameters may also affect power consumption. For example, a truck and a car provides different amount of air drag reduction.

Alternatively, the obtaining S1 may be based on measurements. More specifically, the vehicle 1 may try some different following distances and measure how much energy is consumed at the different following distances. This may be done during driving (i.e. when the vehicle is about to use the data), which has the advantage that all parameters affecting the drag will be accurate. Alternatively, the measurements may be performed in advance for example on a test track. Data representing power consumption for different types of preceding vehicles, road conditions and speeds can then be obtained S1 from a data storage.

The obtaining may need to be repeated as conditions change. For example, the amount of energy required to propel the vehicle 1 should be recalculated if the followed vehicle 2 changes, as drag depend on type of vehicle.

In order to determine the following distance, disadvantages of driving too close are also investigated. This is done by prediction as the future driving environment is only partly known. For example, the road properties may be known from map data, while traffic is harder to determine and must be predicted. In this disclosure, the prediction takes the historic driving behavior, and in particular historic braking behavior, of the vehicle 1 into account. In other words, the method further comprises predicting S2, based on brake actuation performed by the vehicle 1 during a previous time period, one or more driving disadvantages that will be caused by braking along an upcoming road 3 as a function of the following distance $d_{tar}$. Various driving disadvantages may be predicted, such as energy loss, driver or passenger discomfort and safety risks. For example, the more severe braking is considered. The disadvantages are predicted based on brake actuation, which is any measure of braking performed in the previous time period. The measure may be indicative of braking force or braking energy. There are different ways of obtaining braking force or brake energy. For example, brake energy can be obtained by recording change in speed of the vehicle 1. An alternative is to register brake actuation events, in other words by calculating how many times and how much the brakes have been engaged. The brake actuation may include both braking with primary brakes 12 and braking with secondary brakes 13.

The time period considered is typically reasonably long to cover a plurality of braking events. In other words, the time period comprises a plurality of minutes or maybe even hours depending on the type of driving. In some embodiments, the length of the previous time period is based on a speed limit of the road the vehicle 1 is travelling on. For example, the previous time period is about 5 minutes, or about 10 minutes for a certain speed limitation.

The length of the time period may be dynamic and may also depend on whether driving conditions have changed, such as if the vehicle has entered another type of road, such as leaving a city and entering a highway. Hence, a time period of 5 or 10 minutes mentioned above could be ignored if a shift from one speed limit region to another is detected. Hence, when entering a new type of road historic data from the previous road may be ignored. In some embodiments, the method comprises, adjusting S5 the previous time period, upon detecting a change in speed limit of the road the vehicle is driving. This step is illustrated last in the method in FIG. 3 but may be performed at any time when the change is detected.

The predicting S2 of disadvantages is based on brake actuation, which may comprise a number (or count) of braking events and/or applied braking torque. If the predicting of disadvantages is based on how often the vehicle has braked, the distribution of the brake events may also be considered. For example, brake events happening recently may be weighted to have higher impact. In other words, in some embodiments, the predicting S2 is based on a count of brake events and/or timing of brake events performed during the previous time period.

A variety of metrics may be defined to represent the brake actuation. For example, the predicted of disadvantages is based on a metric defining braking density, braking force, braking energy, or recent braking behavior. In other words, in some embodiments, the predicting S2 is based on a metric indicative of brake actuation comprises a highest braking force applied by the vehicle 1 during the previous time period.

Another possibility is to study all braking forces above a certain level. In other words, in some embodiments, the predicting S2 is based on a metric indicative of brake actuation comprises an upper quartile of braking force applied by the vehicle 1 during the previous time period. For example, the metric may represent a lower boundary of the upper quartile or an average or median of brake forces within the upper quartile.

A further possibility is to study an average braking. In other words, in some embodiments, the predicting S2 is based on a metric indicative of brake actuation comprises median or average braking force applied by the vehicle 1 during the previous time period.

Similar to braking force braking energy may be used as a measure of brake actuation. For example, the brake energy during the previous time period may be monitored and used to predict braking in the upcoming road.

The prediction may in addition be based on other data if available. For example, if braking applied by the vehicle travelling ahead 2 during the previous time period can be observed or retrieved via Vehicle-to-everything, V2X, communication, the prediction may be based on the braking applied by the vehicle travelling ahead 2. Another option is experienced highest, median, or upper quartile braking of vehicles sent over V2X for the current area.

The disadvantages caused by braking is then compared to the air resistance reduction from staying close to the target vehicle when selecting a suitable following distance. In other words, the method comprises determining S3 the following distance $d_{tar}$, based on the obtained amount and on the predicted driving disadvantages caused by braking along the upcoming road. The upcoming road may herein refer to a certain road segment or section, such as a road segment of a few hundred metres or kilometres.

In one embodiment, the determining S3 strives at finding an optimal combination of predicted energy lost due to braking (in particular friction braking) compared to energy saved by following closely and reducing drag. In other words, in some embodiments, the determining S3 is performed in consideration of a sum of energy required to propel the vehicle 1 in the upcoming road and a predicted energy loss caused by braking.

The determination could be performed using a predefined formula that takes various parameters into account. In other words, in some embodiments, the determining S3 comprises solving an optimization problem to determine a minimum total energy consumption.

The determining S3 of the following distance may in addition be affected by other factors such as speed, mass (for example varying load), and environmental factors that are for example related to safety. All in all, it is about deciding how much energy can be saved and whether it is worth it. In other words, the determining S3 of the following distance $d_{tar}$ is further determined based on one or more of a reference following distance input by user, road inclination, road friction.

FIG. 4 illustrates a control arrangement 10 configured to determining a following distance $d_{tar}$, between a vehicle 1 and a vehicle travelling ahead 2. The control arrangement 10 may be arranged in the vehicle 1 (FIG. 1).

The control arrangement 10 comprises control circuitry to perform the method according to any one of the steps, examples or embodiments as described herein. The control arrangement 10 may include one or more Electronic Control Units (ECUs) connected to a controller area network (CAN). For example, the control arrangement 10 may be an Electrical Control Unit, ECU, of the ACC.

More in detail, the control arrangement 10 comprises one, or more, computer(s) 101 and memory 102. The computer 101 comprises any hardware or hardware/firmware device implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit, or any other device capable of electronically performing operations in a defined manner. In some embodiments, the computer-readable medium may be a non-transitory computer-readable medium, such as a tangible electronic, magnetic, optical, infrared, electromagnetic, and/or semiconductor system, apparatus, and/or device. The computer-readable memory is for example one or more of the memories in the control arrangement 10. Hence, the proposed method may be implemented as a computer program. The computer program then comprises instructions which, when the computer program is executed by a computer, cause the computer to carry out the method according to any one of the aspects, embodiments or examples as described herein.

In some embodiments the control arrangement 10 comprises a communication interface 103 configured to enable wireless communication with off-board devices, such as with other vehicles, road objects or with a data storage, such as a cloud server. The wireless communication may be performed using any suitable protocol for V2X communication. This communication may be performed via a Controller Area Network, CAN, or directly via an embedded modem.

More specifically, the control arrangement 10 is configured to obtain an amount of energy required to propel the vehicle 1 along the upcoming road 3 as a function of following distance to the vehicle travelling ahead 2 and to predict S2, based on brake actuation performed by the vehicle 1 during a previous time period, one or more driving disadvantages that will be caused by braking along an upcoming road 3 as a function of the following distance. The control arrangement 10 is also configured to determine the following distance, based on the obtained amount and on the predicted driving disadvantages caused by braking along the upcoming road.

In further embodiments, the control arrangement is configured to perform the method according to any one of the embodiments described in connection with FIG. 3

The terminology used in the description of the embodiments as illustrated in the accompanying drawings is not intended to be limiting of the described method, control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A method for determining a following distance to be used between a first vehicle and a second vehicle travelling ahead of the first vehicle as the two vehicles are in operation, the method comprising:

determining an amount of energy required to propel the first vehicle along an upcoming road section, where the amount of energy is a function of following distance between the first and second vehicles;

predicting, based on brake actuation performed by the first vehicle during a previous time period, one or more driving disadvantages that will be caused by braking along the upcoming road as a function of following distance;

determining a following distance to use in controlling the first vehicle, based on the determined amount of energy and on the predicted driving disadvantages caused by braking along the upcoming road section; and controlling operation of the first vehicle through the upcoming road section using the determined following distance.

2. The method according to claim 1, wherein the predicting is based on a metric indicative of brake actuation comprising one or more of:

highest braking force applied by the vehicle during the previous time period, an upper quartile of braking force applied by the vehicle during the previous time period, and median or average braking force applied by the vehicle during the previous time period.

3. The method according to claim 1, wherein the predicting is based on a count of brake events and/or timing of brake events performed during the previous time period.

4. The method according to claim 1, wherein a duration of the previous time period is at least 5 minutes.

5. The method according to claim 1, wherein driving disadvantages includes one or more of energy loss, driver or passenger discomfort, and safety risks.

6. The method according to claim 1, wherein the determining is performed in consideration of a sum of energy required to propel the vehicle in the upcoming road and a predicted energy loss caused by braking.

7. A method for determining a following distance to be used between a first vehicle and a second vehicle travelling ahead of the first vehicle as the two vehicles are in operation, the method comprising:

determining an amount of energy required to propel the first vehicle along the upcoming road section, where the amount of energy is a function of following distance between the first and the second vehicles;

predicting, based on brake actuation performed by the first vehicle during a previous time period, one or more driving disadvantages that will be caused by braking along an upcoming road as a function of following distance, wherein a length of the previous time period is based on a speed limit of the road the vehicle is travelling on;

determining a following distance to use in controlling the first vehicle, based on the determined amount of energy and on the predicted driving disadvantages caused by braking along the upcoming road section; and controlling operation of the first vehicle through the upcoming road section using the determined following distance.

8. The method according to claim 7, further comprising, upon detecting a change to a new speed limit of the road the vehicle is driving, adjusting the previous time period based on the new speed limit.

9. The method according to claim 1, wherein the obtaining an amount of energy required to propel the first vehicle is based on measurements and/or on predetermined criteria.

10. The method according to claim 1, wherein the obtaining an amount of energy required to propel the first vehicle is based on one or more of the following: vehicle speed, type of vehicle travelling ahead, inclination of road and/or friction.

11. The method according to claim 1, wherein the following distance is further based on one or more of:

a reference following distance input by a user, road inclination, road friction, driver and passenger comfort, and/or safety limits.

12. The method according to claim 1, wherein a duration of the previous time period is at least 10 minutes.

13. A computer program product stored on a non-transitory computer-readable medium, said computer program product for determining a following distance to be used between a first vehicle and a second vehicle travelling ahead of the first vehicle as the two vehicles are in operation, wherein said computer program product comprising computer instructions to cause one or more control devices to perform the following operations:

determining an amount of energy required to propel the first vehicle along an upcoming road section, where the amount of energy is a function of following distance between the first and second vehicles;

predicting, based on brake actuation performed by the first vehicle during a previous time period, one or more driving disadvantages that will be caused by braking along the upcoming road as a function of following distance;

determining a following distance to use in controlling the first vehicle, based on the determined amount of energy and on the predicted driving disadvantages caused by braking along the upcoming road section; and controlling operation of the first vehicle through the upcoming road section using the determined following distance.

14. A control arrangement configured to determining a following distance to be used between a first vehicle and a second vehicle travelling ahead of the first vehicle as the two vehicles are in operation, wherein the control arrangement is configured to:

determine an amount of energy required to propel the first vehicle along an upcoming road section, where the amount of energy is a function of following distance between the first and second vehicles;

predict, based on brake actuation performed by the first vehicle during a previous time period, one or more driving disadvantages that will be caused by braking along the upcoming road as a function of following distance;

determine a following distance to use in controlling the first vehicle, based on the determined amount of energy and on the predicted driving disadvantages caused by braking along the upcoming road section; and control operation of the first vehicle through the upcoming road section using the determined following distance.

15. A vehicle comprising a control arrangement configured to determining a following distance, between a first vehicle and a second vehicle travelling ahead as the two vehicles are in operation, wherein the control arrangement is configured to:

an amount of energy required to propel the first vehicle along an upcoming road section, where the amount of energy is a function of following distance between the first and second vehicles;

predict, based on brake actuation performed by the first vehicle during a previous time period, one or more driving disadvantages that will be caused by braking along the upcoming road as a function of following distance;

determine a following distance to use in controlling the first vehicle, based on the determined amount of energy and on the predicted driving disadvantages caused by braking along the upcoming road section; and control operation of the first vehicle through the upcoming road section using the determined following distance.

* * * * *